United States Patent Office

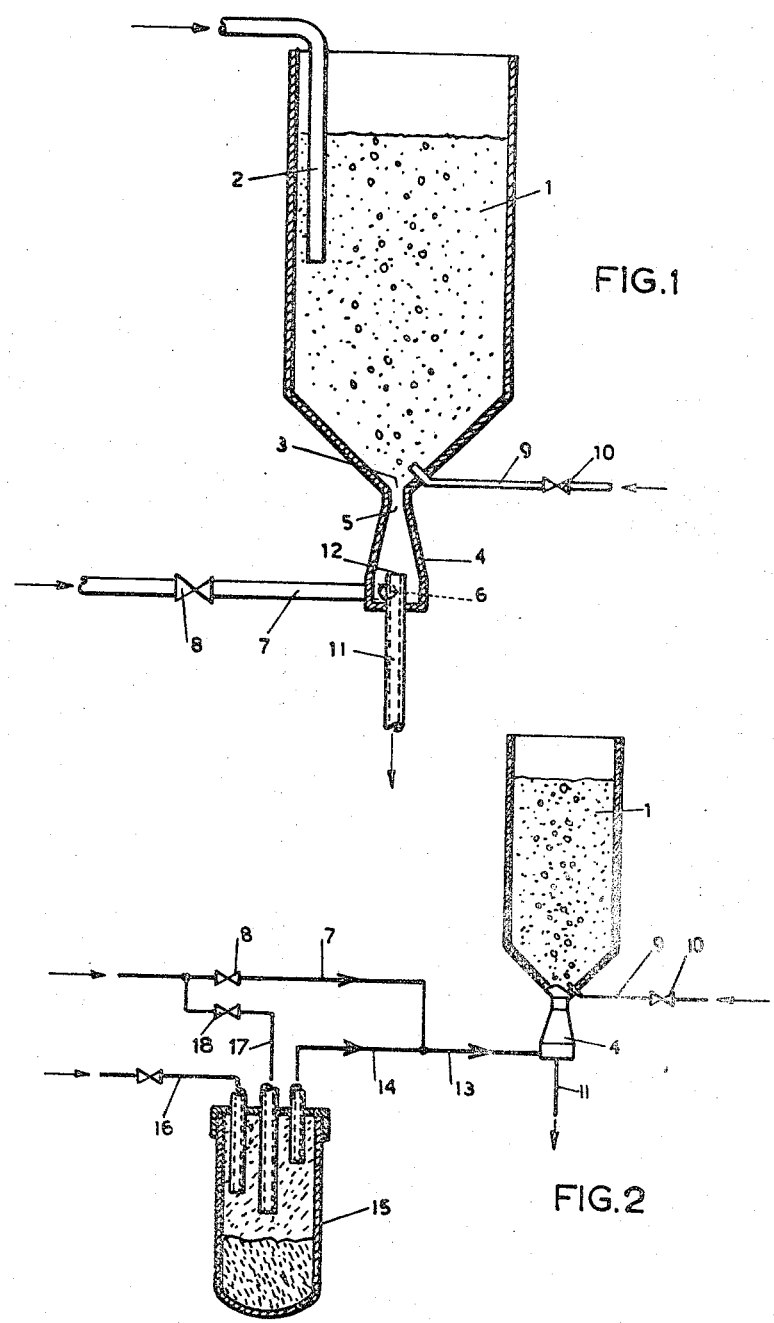

3,337,090
Patented Aug. 22, 1967

3,337,090
METHOD FOR STORING, KEEPING IN STOCK AND/OR DISCHARGING WITH ADJUSTABLE CONCENTRATION THE HEAVIER COMPONENT OF A FLUID MIXTURE
Alexander Houtzeel, Grenoble, France, and Hans Bugter, Mol, Belgium, assignors to Reactor Centrum Nederland, The Hague, Netherlands
Filed July 23, 1963, Ser. No. 297,013
Claims priority, application Netherlands, July 27, 1962, 281,462
1 Claim. (Cl. 222—1)

The invention relates to a method for storing, keeping in stock and/or discharging with adjustable concentration the heavier component of a fluid mixture consisting of two components having different specific weights, at least the lighter component of said mixture being a liquid. In many domains of the technique, such as that of the atomic energy, it happens that the heavier component of a fluid mixture, e.g. a suspension or a mixture of liquids, has either to be stored in a tank, that means led to a container in order to be kept therein, or temporarily kept in stock in a tank, in which said component is already present, or to be passed on with a certain concentration in the mixture in order to be used or treated. In this respect it is thought of particles of fissionable substance of a suspension reactor which for use in the reactor system as well as for the chemical treatment after active use have to be present in predetermined concentrations in the fluid mixture to be used or to be treated, respectively. Sometimes it is also necessary that such particles or dangerous, say radio-active, liquids are separated from mixtures having predetermined mixing ratios and thereafter are kept in stock or passed on in mixtures having different mixing ratios. For these purposes a storage tank adapted to be drained in an adjustable manner and a separating device are required. However, it has appeared that in many cases an exhaust opening adapted to be closed or adjusted by a valve, a stop-cock or like adjustable mechanical valve device is not suitable for the dosed discharge of the solid particles of a suspension which for their temporary storage has been settled in a container, since the particles then form a too solid and compact mass in the container to be removed therefrom in a regular and dosed flow. Moreover a strong erosion of the parts of the valve device occurs. For dangerous liquids an adjustable mechanical valve provided in the exhaust opening of the tank has the disadvantage that the sealing-off of the conduit system to the outside is difficult to realize.

The invention has the object to provide a simple method, in which the closing of the exhaust opening of the tank, the regulation of the flow of solid particles or the flow or liquid to be removed from the tank through said opening and, if desired, the regulation of the flow of particles or liquid to be led into the tank through said opening are performed without any mechanical valve device. In accordance with the invention this is obtained by means of a storage tank having at its lowest point an exhaust opening and of a cyclone having a supply opening, a first discharge opening for the heavier separation component produced in the cyclone and a second discharge opening for the lighter separation component produced in the cyclone, said supply opening being at least connected to a conduit provided with an adjustable valve for the controllable supply of the liquid forming the lighter component of the mixture and said first discharge opening being connected with the exhaust opening of the storage tank. If the tank contains a suspension (either solid particles in a lighter liquid or liquid particles in a lighter liquid) and additional lighter liquid is supplied to the cyclone, the presence or absence of particles in the liquid stream leaving the discharge opening for the lighter component and the concentration of the particles, if any are present in that stream, will depend on the quantity of lighter liquid supplied per unit of time. The cyclone thus operates as a controllable valve device. Therein the quantity of lighter liquid supplied per unit of time to the cyclone defines the regulating behaviour.

However, it is also possible to use the cyclone as a separating device. In that case the supply opening of the cyclone is also connected to a conduit for the supply of mixture. Now, if mixture or both mixture and an additional quantity of liquid forming the lighter component of the mixture are supplied through said supply opening, it depends on the total quantity of lighter liquid supplied per unit of time to the cyclone, whether the cyclone will separate the maximum quantity of heavier particles or liquid in accordance with its capacity from the supplied mixture and will propel said particles or liquid towards the storage tank or whether it will supply a portion of the mass of particles or of the heavier liquid to said tank and will discharge the remaining portion of said mass or said heavier liquid together with the lighter liquid through its discharge opening for the lighter separation component. In this manner a very simple apparatus is obtained, by means of which from a suspension or a mixture of liquids an adjustable portion of the heavier component may be stored in a storage tank and the remaining portion may be passed on while having a desired concentration in the mixture.

Preferably the cyclone is mounted under the storage tank and is turned with its discharge opening for the heavier separation component produced in the cyclone upwards.

In order to facilitate the discharge of the solid particles of a suspension from the storage tank it is recommended to provide said tank with a device for agitating the contents thereof. Such a device may be a conduit for the supply of gas opening into the tank at a spot near the exhaust opening, a mechanical vibrator, a stirrer, a heating device to produce convection currents or an other apparatus for stirring the mass contained in the storage tank.

For the elucidation of the invention reference is made to the accompanying drawing. Therein is:

FIG. 1 a diagrammatical view of a first embodiment, and

FIG. 2 a diagrammatical view of a second embodiment of an apparatus designed in accordance with the invention.

In FIG. 1 a storage tank is indicated by 1 and a conduit for the supply of a suspension to said tank is designated by 2. The tank 1 is provided with an exhaust opening 3, to which a cyclone 4 is directly connected with its opening 5 for the discharge of the heavier separation component produced in the cyclone. The supply opening 6 of the cyclone is connected to a conduit 7 having a controllable valve 8 for the dosed additional supply of the lighter liquid component of the suspension. Indicated by 9 is a conduit provided with an adjustable valve 10 for the supply of gas to the storage tank 1. This gas conduit opens into the tank 1 in the vicinity of the exhaust opening 3. The gas bubbles rising through the suspension prevent that the solid particles settle and form a too compact mass. Furthermore the cyclone 4 is provided with a discharge opening 12 connected to a conduit 11 and meant for the discharge of the lighter separation component produced in the cyclone.

It has been found that the cyclone operates as a very accurately adjustable valve provided in the exhaust opening 3 of the storage tank. If a large amount of liquid is supplied per unit of time through the conduit 7 the solid particles of the suspension are found to remain in the tank 1, so that only pure liquid is discharged through the condit 11. However, if the supply of additional liquid through the conduit 7 is decreased below a predetermined value, solid particles escape from the tank 1 through the exhaust opening 3 and pass out of the cyclone 4 as a suspension through the conduit 11. The mixing ratio of this suspension depends on the intensity of the additional liquid current, that means may be controlled by means of the valve 8. Should the valve 8 be closed, the conduit 11 will discharge a suspension having a mixing ratio equal to that of the suspension contained in the tank 1. Consequently, the cyclone 4 and the conduit 7 provided with the valve 8 for the controllable supply of additional liquid operate as a closable and adjustable mixing valve, by means of which the concentration of the solid particles in the fluid mass discharged through the conduit 11 can be adjusted from the value zero to the maximum value of the suspension contained in the tank 1. The advantage of this apparatus over normal valves, stop-cocks or other valve devices is that a very accurate adjustment is possible and the danger of erosion is negligibly small. The suspension level in the tank 1 adjusts itself in dependence upon the intensity of the liquid flow through the conduit 7.

It is not necessary that a suspension is supplied to the storage tank 1 through a separate conduit (conduit 2). It is also possible to supply the suspension through the supply conduit 7 of the cyclone 4 as shown in FIG. 2. In this apparatus the supply opening of the cyclone 4 is connected to a mixing conduit 13, to which both the conduit 7 for the additional supply of liquid and a conduit 14 for the supply of suspension are connected. The conduit 14 connects a closed container 15 with the supply conduit 13. The container 15 is filled with suspension through a conduit 16. The solid particles of this suspension are allowed to settle in said container and they are temporarily stored therein. Additional liquid may be supplied to the container 15 through a conduit 17 provided with an adjustable valve. This additional liquid will stir the solid particles in the container 15 and also serves to convey said particles from the container 15 through the conduit 14 to the mixing conduit 13 and the cyclone 4. If the total fluid current through the conduit 13 exceeds a predetermined value, the maximum quantity of solid particles corresponding to the capacity of the cyclone 4 will be separated from the supplied suspension and propelled to the storage tank 1. However, should said current be less than the said value an accurately dosed quantity of solid particles greater than the minimum quantity defined by the capacity of the cyclone will be discharged through the conduit 11.

Although in the description of the embodiments only a suspension, that means a mixture of solid particles and liquid, is mentioned the method according to the invention operates equally well with a mixture of two liquids having different specific weights. Also in that case the mixing ratio of the liquid mixture discharged through the conduit 11 is defined by the quantity of lighter liquid supplied per unit of time.

What is claimed is:

A new use of a cyclone separator as a valve in association with a mass of a suspension of heavy particles in a lighter liquid for obtaining a liquid stream containing dispersed particles in a concentration in the range from the concentration of particles in said mass of suspension down to zero concentration, said cyclone separator being of the type having an apex opening, a base opening and a tangential inlet opening, said new use comprising: placing the apex opening of the cyclone separator in free and continuous communication with the mass of suspension at a location below the upper surface thereof; continuously maintaining the particles dispersed throughout the mass, continuously withdrawing a stream of liquid through the base opening of the cyclone separator; and controlling the concentration of particles in the withdrawn stream from a maximum equal to the concentration of particles in said mass of suspension down to zero concentration, the maximum concentration of particles in the stream being obtained by withdrawing suspension from the mass thereof through the base opening in the cyclone separator, zero concentration being obtained by withdrawing a stream through the base opening and simultaneously introducing liquid into the cyclone separator through the tangential inlet opening therein at a sufficiently high flow rate that particles in the mass of suspension are prevented from passing to the base opening, and intermediate concentrations being obtained by controlling the flow rate of liquid being introduced into the cyclone separator through the tangential inlet opening at a quantity below said sufficiently high flow rate.

References Cited
UNITED STATES PATENTS

| | | | |
|---|---|---|---|
| 2,774,516 | 12/1956 | Jensen | 222—195 |
| 2,874,118 | 2/1959 | Albertsen | 210—512 X |
| 3,166,496 | 1/1965 | Kelsall | 210—512 X |

SAMIH N. ZAHARNA, *Primary Examiner.*

REUBEN FRIEDMAN, *Examiner.*

D. M. RIESS, *Assistant Examiner.*